United States Patent

Kliman et al.

Patent Number: 5,859,483
Date of Patent: Jan. 12, 1999

[54] STAGGERED COOLING HOLES FOR ENHANCED HEAT TRANSFER IN AIR-COOLED MOTORS

[75] Inventors: Gerald Burt Kliman, Schenectady, N.Y.; Richard Kenneth Barton, Erie, Pa.

[73] Assignee: General Electric Company, Schenectady, N.Y.

[21] Appl. No.: 959,295

[22] Filed: Oct. 24, 1997

Related U.S. Application Data

[63] Continuation of Ser. No. 358,496, Dec. 19, 1994, abandoned.

[51] Int. Cl.$^6$ .............................. H02K 15/02; H02K 1/20; H02K 1/32
[52] U.S. Cl. .............................. 310/58; 310/54; 310/216; 310/42
[58] Field of Search .................................. 310/58, 59, 54, 310/216, 42, 61

[56] References Cited

U.S. PATENT DOCUMENTS

| | | | |
|---|---|---|---|
| 406,777 | 7/1889 | Schmid | 310/61 |
| 1,487,221 | 3/1924 | Ehrmann | 310/58 |
| 1,857,023 | 5/1932 | Hoseason | 310/61 |
| 3,684,906 | 8/1972 | Lenz | 310/61 |
| 3,783,318 | 1/1974 | Widstrand | 310/216 |
| 4,301,386 | 11/1981 | Schweder et al. | 310/59 |
| 4,363,982 | 12/1982 | Kaminski | 310/61 |
| 4,888,866 | 12/1989 | Hansen | 29/598 |
| 4,912,350 | 3/1990 | Parshall et al. | 310/59 |
| 5,173,629 | 12/1992 | Peters | 310/216 |
| 5,331,238 | 7/1994 | Johnsen | 310/58 |
| 5,349,741 | 9/1994 | Neuenschwander | 310/216 |
| 5,365,132 | 11/1994 | Hann et al. | 310/58 |
| 5,491,371 | 2/1996 | Ooi | 310/58 |

FOREIGN PATENT DOCUMENTS

| | | | |
|---|---|---|---|
| 3334501 | 3/1984 | Germany | 310/59 |
| 63-181644 | 7/1988 | Japan | 310/59 |
| 1171906 | 8/1985 | U.S.S.R. | 310/59 |

*Primary Examiner*—Clayton LaBalle
*Attorney, Agent, or Firm*—Ann M. Agosti; Marvin Snyder

[57] ABSTRACT

A method for fabricating a stack of motor laminations comprises forming cooling holes in each of the motor laminations and stacking the motor laminations with respective ones of the cooling holes in the laminations at least partially coincident to form a staggered cooling passage by having at least some of the cooling holes extending further into the cooling passage than others of the cooling holes. In one embodiment, the cooling holes can be perturbed cooling holes which are radially displaced from another cooling hole, azimuthally displaced from a hole axis, having an asymmetrical shape, being a different size from another cooling hole, or being shaped so that the rotation and stacking of a subsequently applied lamination results in a situation wherein adjacent cooling holes are not precisely aligned.

9 Claims, 7 Drawing Sheets

STAGGERED COOLING HOLES FOR ENHANCED HEAT TRANSFER IN AIR-COOLED MOTORS

This application is a Continuation of application Ser. No. 08/358,496 filed Dec. 19, 1994 now abandoned.

BACKGROUND OF THE INVENTION

1. Field of the Invention

The present invention relates generally to motor lamination stacks and, more particularly, to cooling passages in motor lamination stacks.

2. Description of the Related Art

In conventional motor fabrication techniques, rotor and stator cores are formed by stacking laminations of iron or steel. Each lamination has holes which may be used for insertion of motor windings, insertion of through-bolts, or application of cooling air, for example. Lamination holes are generally formed by mechanical punching, and can also be formed using lasers or chemical etch solutions.

The winding holes are typically referred to as winding "slots" which either can be situated entirely within the lamination or can have one portion extending open to an outer edge of the lamination. The winding slots and through-bolt holes are stacked so as to be aligned with smooth surfaces to ease in the insertion of respective coils and bolts with minimum wasted space for clearance.

Smooth surfaces, however, are detrimental for holes used as air passages for cooling the motor because smooth surfaces provide stable and streamlined airflow. Good heat transfer requires turbulent boundary layers and efficient mixing of air at the boundary layer surface with air in the bulk flow of the cooling stream.

Turbulence can be achieved by roughening the surfaces of the passages. In earlier motor applications, when tolerances on laminations were less precise, a stagger in the lamination stacking resulted naturally in rough passage surfaces and adequate heat transfer occurred. This natural stagger is not an option in conventional motor fabrication techniques that require precise punchings of holes for the winding and through-bolt passages. In these conventional techniques, to provide irregular cooling passage surfaces, extra roughening steps are required to treat the cooling passage surfaces.

SUMMARY OF THE INVENTION

Accordingly, an object of the present invention is to provide a staggered cooling passage surface, similar to that achieved by poorly punched laminations, with the modern high precision winding and through-bolt laminations required for current fabrication techniques at a minimum of additional effort and cost.

Briefly, in accordance with a preferred embodiment of the invention, a method for fabricating a stack of motor laminations comprises forming cooling holes in each of the motor laminations and stacking the motor laminations with at least some respective ones of the cooling holes in the laminations at least partially coincident and forming a staggered cooling passage by extending further into the cooling passage than others of the cooling holes.

In one embodiment, the step of forming cooling holes comprises forming perturbed cooling holes. As will be further described below, the phrase "perturbed cooling hole" is meant to encompass, for example, the situations wherein (1) a cooling hole is radially displaced from another cooling hole, (2) a cooling hole is azimuthally displaced from a hole axis, (3) a cooling hole has a perturbed shape in that the cooling hole is asymmetrical or of a different size from another cooling hole, or (4) any other situation wherein the rotation of a subsequently applied lamination would result in a cooling hole passage wherein at least one lamination extends further into the passage than another lamination because the cooling holes are only partially coincident. One embodiment of the fourth example is a situation wherein a number of evenly spaced cooling holes are in a lamination with a number of evenly spaced winding slots, and the lamination is rotated and stacked in such a manner as to result in precise alignment of the winding slots but to cause respective cooling holes to partially overlap each other when forming a cooling passage.

In accordance with another preferred embodiment of the invention, a stack of motor laminations comprises a plurality of motor laminations with at least some of the motor laminations having cooling holes. Adjacent ones of the cooling holes form a staggered cooling hole passage with some of the cooling holes extending further into the cooling passage than others of the cooling holes. The motor laminations have evenly spaced winding slots with adjacent ones of the evenly spaced winding slots forming a substantially smooth winding slot passage.

In accordance with another preferred embodiment of the invention, a method for fabricating a motor lamination for use in a motor having staggered cooling passages and substantially smooth winding slot passages comprises forming perturbed cooling holes in the motor lamination and forming evenly spaced winding slots in the motor lamination.

In accordance with another preferred embodiment of the invention, a motor lamination for use in a motor having staggered cooling passages and substantially smooth winding slot passages comprises a motor lamination having perturbed cooling holes and evenly spaced winding slots.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF PREFERRED EMBODIMENTS OF THE INVENTION

Motor laminations are typically cut from rolls of sheet steel which are not precisely flat and do not have exactly parallel surfaces. When several hundred individual laminations are stacked to fabricate a rotor or stator core, the tolerance deviations can build up and create a lop-sided stack. To compensate for the imprecise nature of sheet steel, the holes in the laminations for the winding slots and through-bolt holes are made symmetrical along one or more axes. If one axis of symmetry is used, the laminations can alternately be flipped over or rotated 180 degrees. If more than one axis is used, the laminations can each be sequentially rotated by a predetermined angle so that the winding slots are aligned. These techniques compensate for the thickness variations of the laminations to reduce lop-sidedness or distortion of the stack. Furthermore, these techniques are used to distribute residual anisotropy (imbalance of magnetic properties due to sheet rolling).

Figure 1:
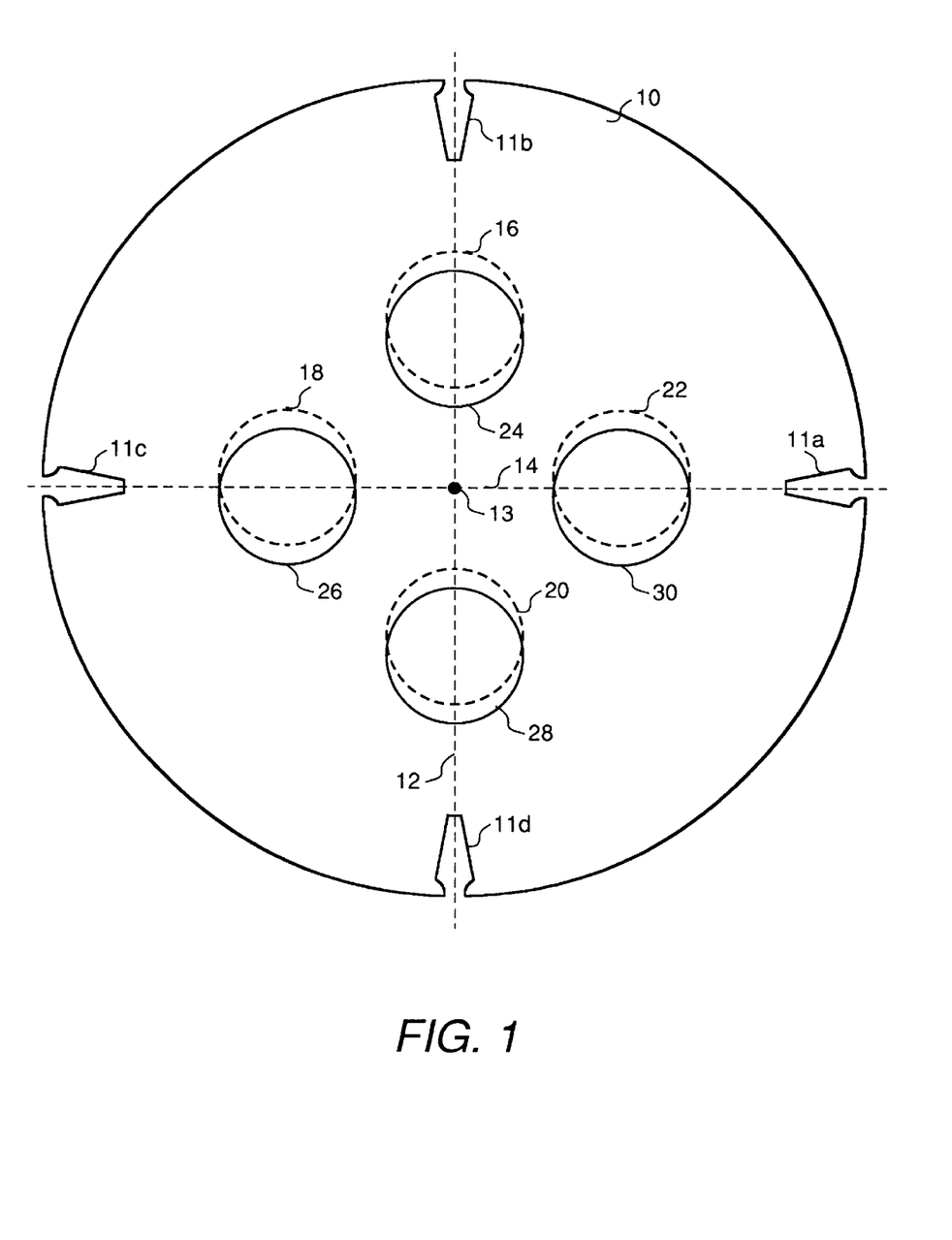
FIG. 1 is a top view of a rotor lamination including cooling holes of the present invention.

FIG. 1 is a top view of a rotor lamination 10 including perturbed, asymmetrical cooling holes of the present invention. Although a rotor lamination is shown in FIG. 1, the invention is equally applicable to stator laminations. For simplicity and clarity FIG. 1 is shown with four cooling holes having exaggerated dimensions. A typical lamination can have about 4 to 100 cooling holes, for example. Through-bolt holes are not shown in FIG. 1. The winding slots 11a, 11b, 11c, and 11d are symmetrical (evenly spaced) on axes 12 and 14. The normal position of cooling holes would be symmetrical on axes 12 and 14 through a lamination center 13 as shown by respective dashed circles 16, 18, 20, and 22. Each of the actual, perturbed holes 24, 26, 28, and 30 is respectively displaced by a small radial or azimuthal distance. Displacement distances on the order of several mils will typically be sufficient to create staggered surfaces.

In the lamination shown in FIG. 1, hole 24 is displaced radially toward the center, hole 26 is displaced azimuthally in the clockwise direction, hole 28 is displaced radially toward the outer edge, and hole 30 is displaced azimuthally in the counterclockwise direction. In FIG. 1, all the cooling holes are shown as being displaced in the same direction by the same distance. This embodiment is particularly convenient because it is not difficult for die makers to move punching rods all in the same direction. However, the displacements can be designed in any convenient manner in order to achieve staggered cooling hole surfaces.

Figure 9:
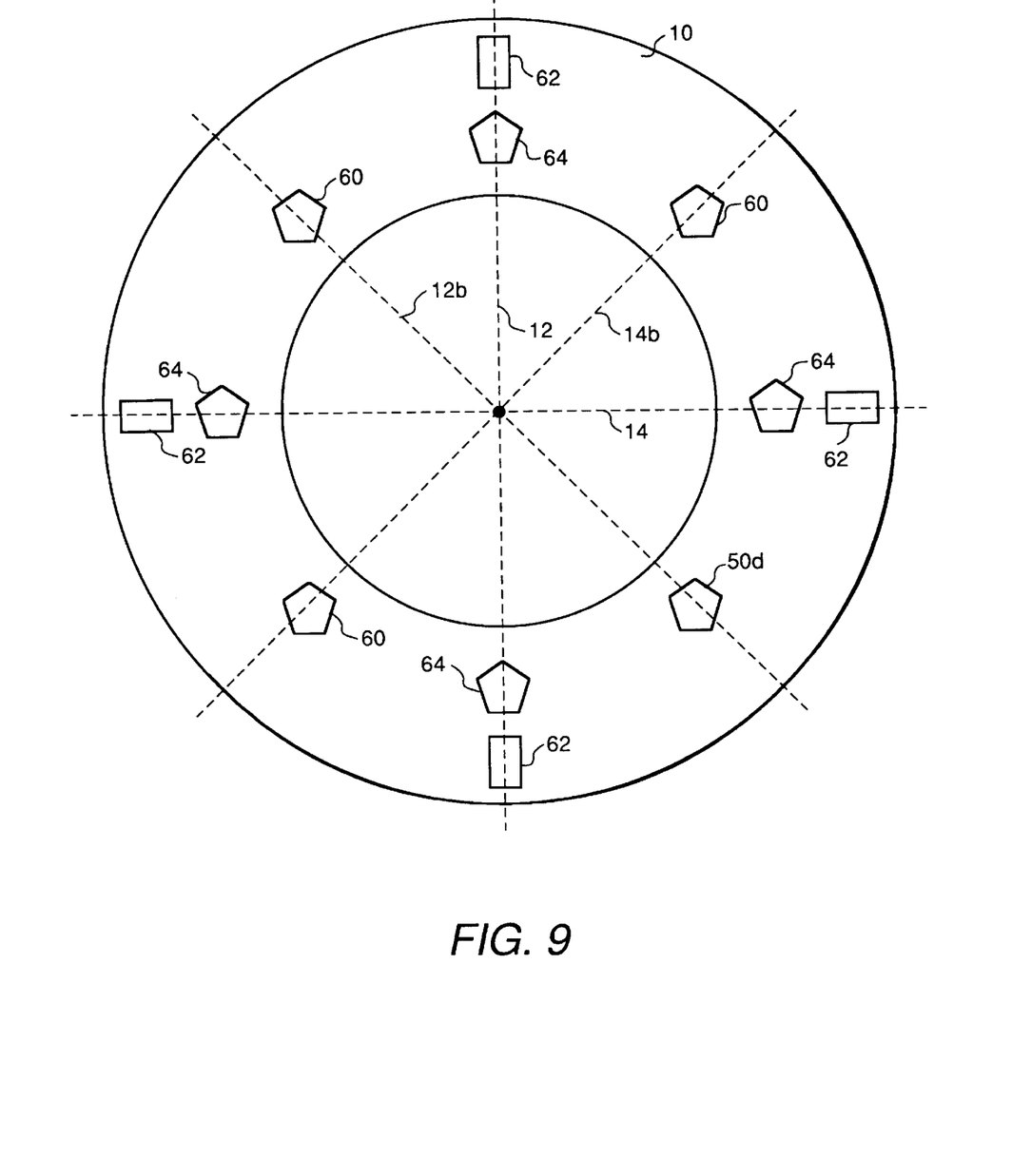
FIG. 9 is a top view of a stator lamination including winding slots situated on winding slot axes distinct from cooling hole axes.
Figure 10:
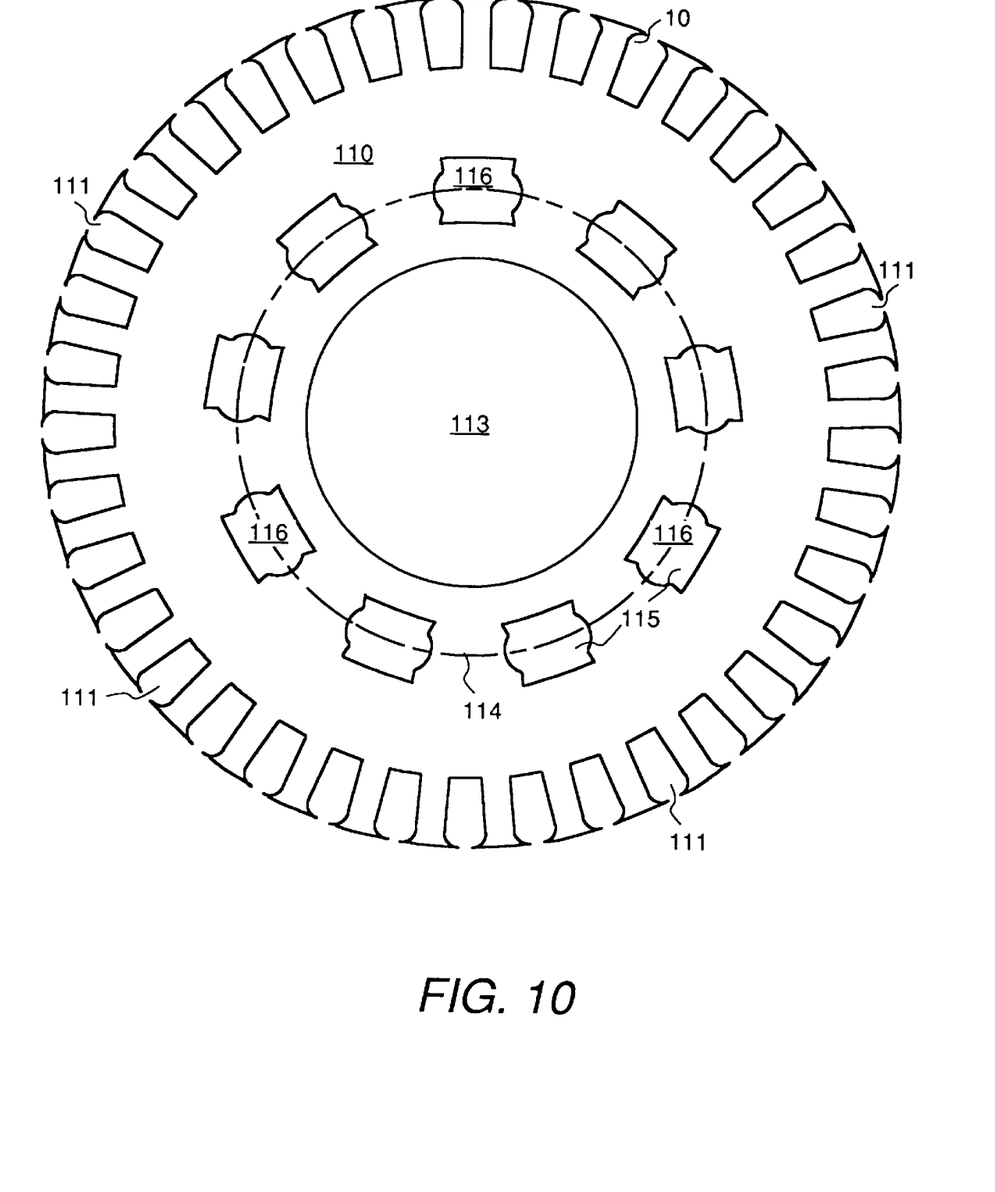
FIG. 10 is a top view of a rotor lamination including fewer cooling holes than winding slots.

Furthermore, although the axes are shown as extending through a diameter with two holes on opposite sides of the lamination center, an axis need not have holes on opposite sides of the lamination center, as would likely be the case if an odd number of axes, such as five, for example, were used. Moreover, the axes of the slots need not be the same axes as the axes for the holes, as shown in FIGS. 9 and 10.

Figure 2:
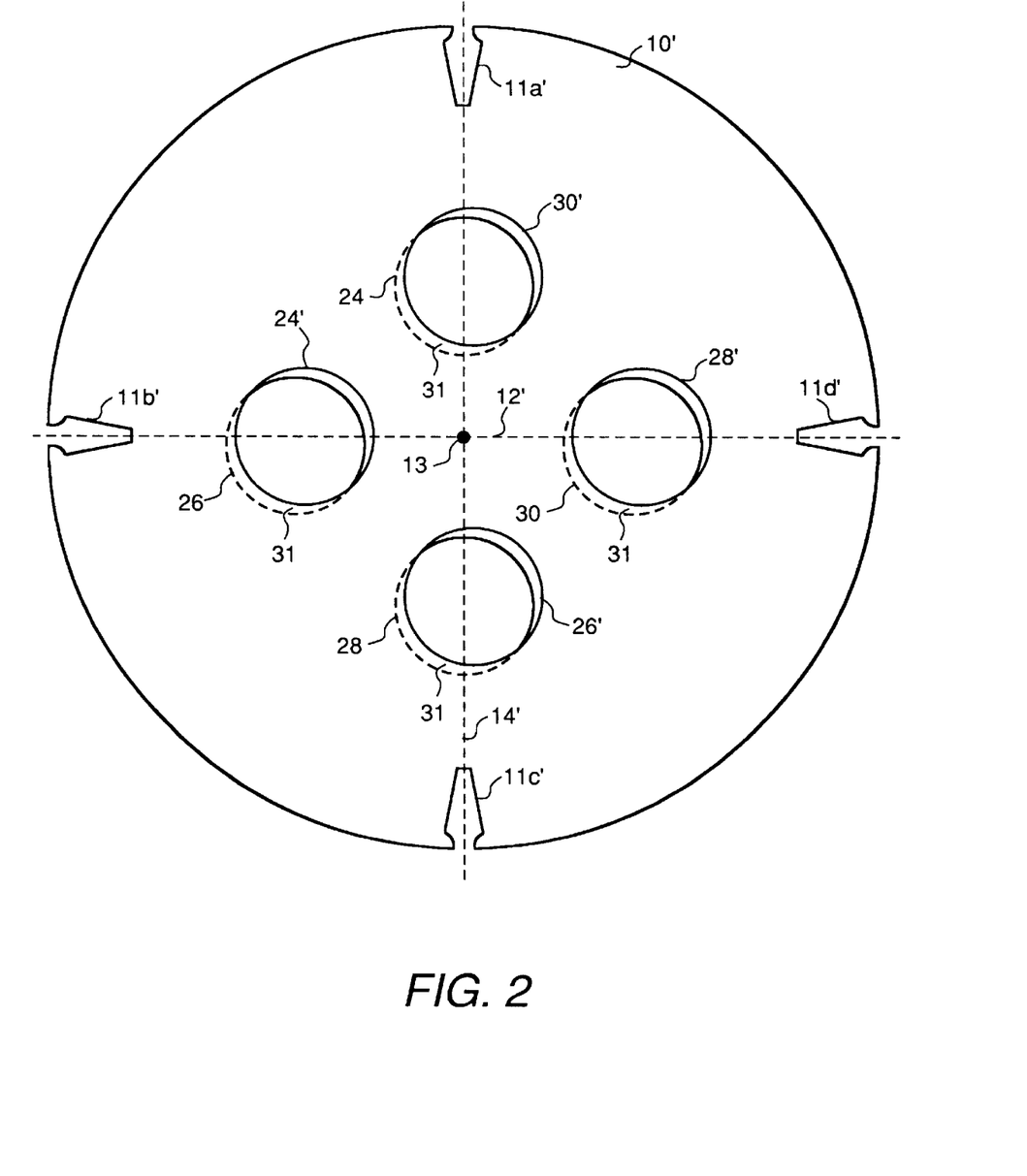
FIG. 2 is a top view of the lamination of FIG. 1 after a second lamination having a ninety degree rotation is applied.

FIG. 2 is a top view of a second lamination 10' having a ninety degree rotation and applied over the lamination of FIG. 1. The rotated lamination 10' has cooling holes 24', 26', 28', and 30' partially overlapping respective holes 26, 28, 30, and 24 of FIG. 1. The rotated lamination also has winding slots 11a', 11b', 11c', and 11d' coincident with respective winding slots 11b, 11c, 11d, and 11a of FIG. 1. A ninety degree rotation is used because there are four slots on two slot axes. The degree of rotation is chosen by determining what degree of rotation will result in a staggered surface. There may be several degrees of rotation that will work for a given design.

For example, when there are two slot axes which are perpendicular and each have holes on opposite sides of the center of the lamination, there are four evenly spaced radii. One appropriate method for determining the degree of rotation is to divide 360 degrees by the number of evenly spaced radii having slots. In this example, 360 degrees divided by four indicates that a ninety degree rotation is desirable. Less desirable, but also acceptable are multiples of ninety degrees such as 270 degree or 180 degree rotations.

To achieve a ninety degree rotation, a first lamination can be placed flat without turning; a second lamination can be turned ninety degrees in either direction and positioned over the first lamination; a third lamination can be turned 180 degrees in either direction before being situated on the second lamination; a fourth rotation can be turned either 270 degrees in the same direction as the second rotation or ninety degrees in the direction opposite that of the second rotation. The fifth lamination need not be physically turned because, by placing it directly on the stack, it would be rotated ninety degrees from the orientation of the fourth lamination. Additional laminations can be rotated and added to the stack in the same manner.

Due to the displacement of the cooling holes, there is a regular offset 31. The number and positions of the holes in FIGS. 1 and 2 are for example only. The perturbed cooling holes can be positioned in any manner desired. For example, holes can be evenly spaced with respect to respective axes and have different radial distances from the center, or holes can be the same radial distance from the center and be situated different distances azimuthally from the respective axes. The example in FIGS. 1 and 2 is a combination of the two options where several holes are moved along the axes and several are moved azimuthally.

Figure 3:
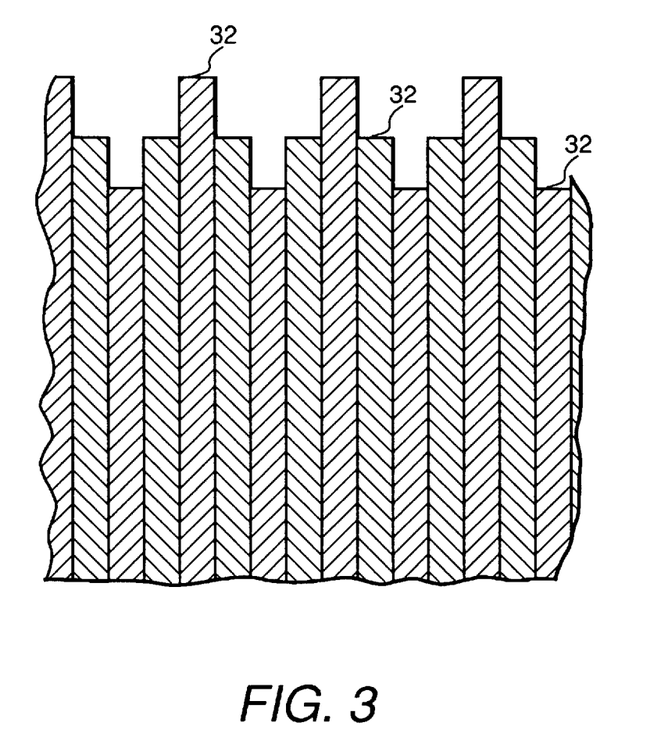
FIG. 3 is a partial sectional side view of a staggered surface resulting from a stack of incrementally rotated laminations.

FIG. 3 is a partial sectional side view of a staggered surface of hole edges 32 expected from the stacking of laminations such as those shown in FIGS. 1 and 2. The stagger can be in any convenient form to cause appropriate movement of cooling air through the laminations. Although in FIG. 3 no two adjacent cooling holes are precisely aligned, there can be embodiments wherein individual cooling holes are aligned but the overall surface is still staggered, as discussed below. The term "staggered" with respect to cooling holes of a cooling passage is meant to encompass cooling holes forming a passage having at least several areas wherein the laminations extend different distances into the passage, thus permitting the mixing of boundary layer air with bulk flow air.

In some instances, it may not be practical to manufacture dies with displaced round holes as described with respect to FIGS. 1 and 2. In these situations, the perturbed cooling holes can be evenly spaced and have the same radial distance from the center if they are designed to have perturbed shapes and/or sizes. For example the shapes can be different sizes, not quite round, and/or otherwise asymmetrical or arbitrary such that they create a staggered effect when laminations are rotated and stacked.

Figure 4:
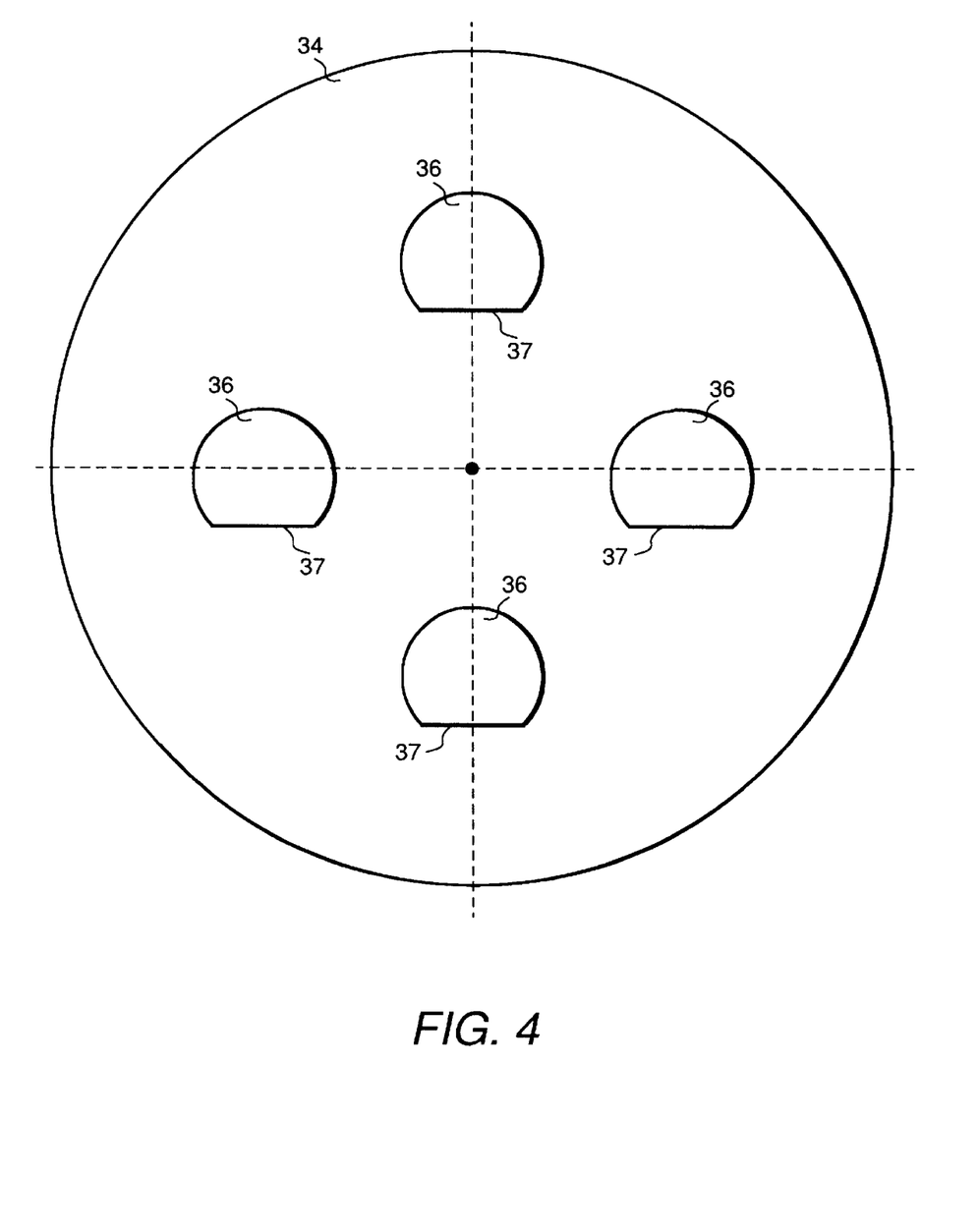
FIG. 4 is a top view of another lamination including cooling holes.

FIG. 4 is a top view of a lamination 34 including perturbed cooling holes 36 with flat surfaces 37. If another lamination is rotated and positioned on top of lamination 34, the rotated flat surfaces would be in a different position on each of the holes, thus creating a stagger.

Figure 5:
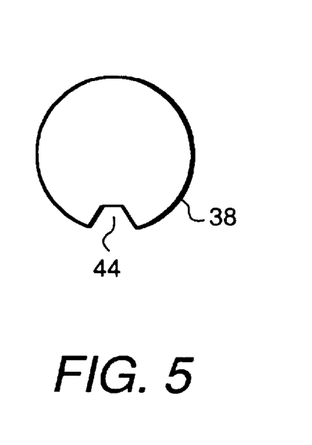
FIGS. 5–7 are views of different shapes of cooling holes which can be used in the present invention.
Figure 6:
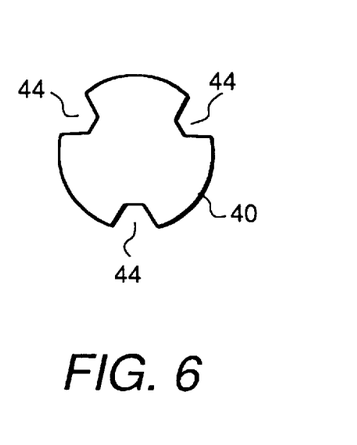
Figure 7:
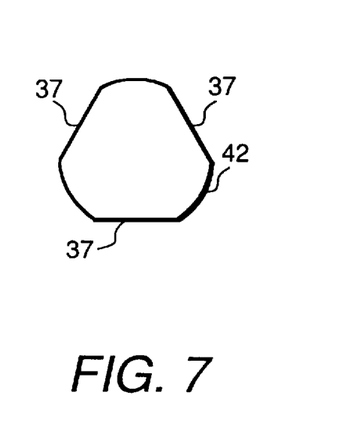

FIGS. 5–7 are views of other shapes of perturbed cooling holes which can be used in the present invention. In FIG. 5, an indentation 44 is used to roughen the surface of cooling holes 38, in FIG. 6 asymmetrical indentations 44 are used in cooling holes 40, and in FIG. 7, asymmetrical flat surfaces 37 are used in cooling holes 42. The cooling holes need not include round surfaces. For example, straight edge surfaces such as rectangles or triangles can also be used, and well as other curved surfaces such as ellipses.

The term "rotate" means that an overlying lamination has its slot axes positioned in a different orientation than the slot axes of an underlying lamination. For example, the second lamination 10a in FIG. 2 has its slot axis 12a over the location of the slot axis 14 of the FIG. 1 lamination 10. The "rotation" can be accomplished using any one of a number of techniques. For example, a physical rotation can be performed by turning the lamination about its center. In another embodiment, the lamination can be flipped over by 180 degrees. In yet another embodiment, a portion of the punching apparatus itself can rotate when punching the laminations which then become pre-rotated and can be stacked directly from the punching apparatus.

Figure 8:
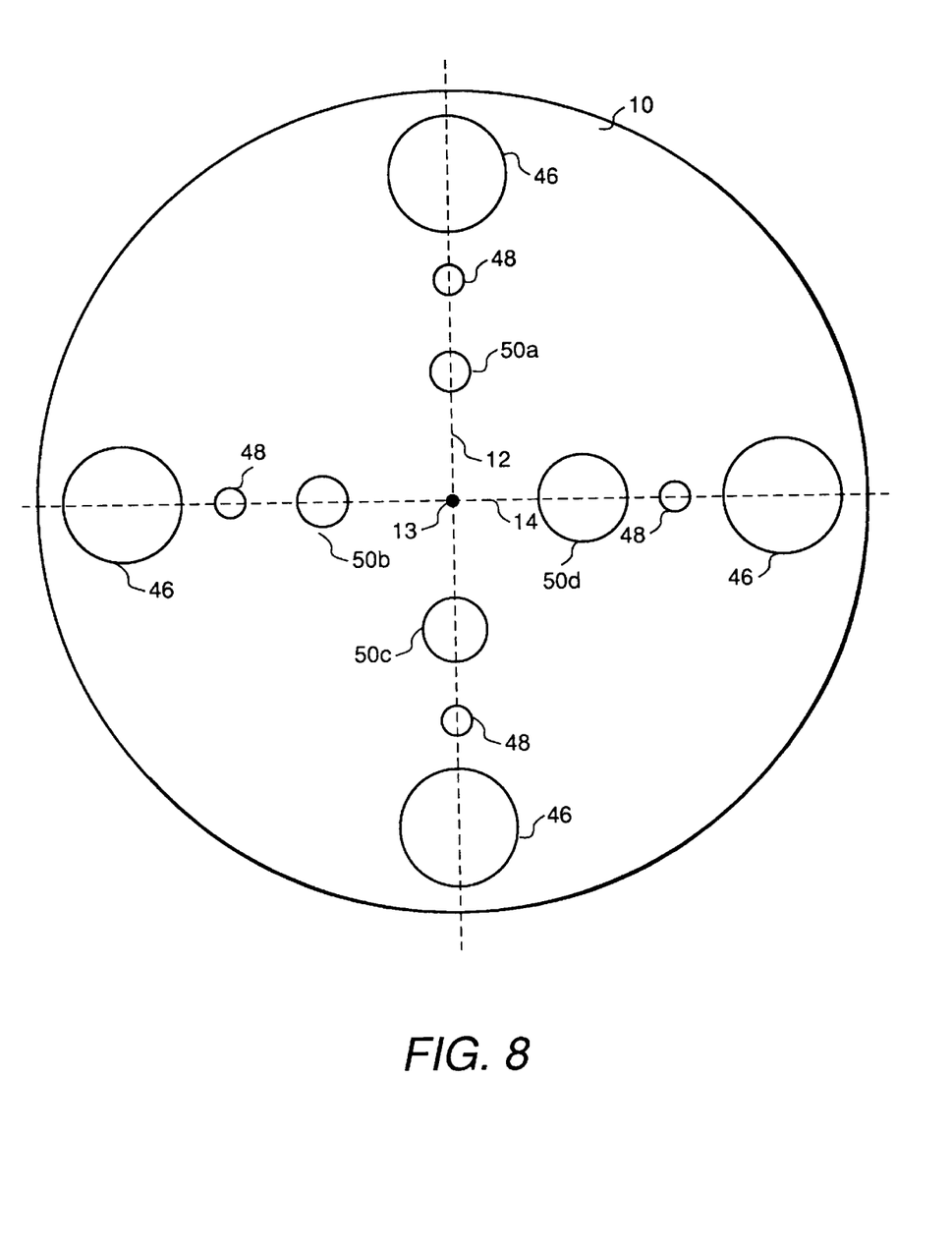
FIG. 8 is a top view of a lamination including winding slots, through-bolt holes, and cooling holes of the present invention.

FIG. 8 is a top view (not to scale) of a rotor lamination including evenly spaced winding slots 46, evenly spaced through-bolt holes 48, and perturbed cooling holes 50a, 50b, 50c, and 50d of the present invention. The winding slots and through-bolt holes are symmetrically situated on the axes, whereas the cooling holes are perturbed with different sizes. Thus, when the motor laminations are rotated and stacked, the resulting lamination stack has staggered cooling passages and smooth winding and through-bolt passages.

FIG. 9 is a top view of a stator lamination including winding slots 62 situated on winding slot axes 12 and 14 distinct from cooling hole axes 12b and 14b on which no winding slots are situated. This embodiment illustrates that the hole axes and winding axes do not have to overlap (be in the same locations). What is important in the embodiment of FIG. 9 is that the hole axes be a predetermined azimuthal distance from the slot axes, so that each time the slot axes of a lamination are rotated, the hole axes are also aligned so that the cooling holes are at least partially coincident and any desired cooling hole passages are formed. Furthermore, although not shown, there can be some cooling holes which become blocked and do not form a cooling passage.

In FIG. 9, one set of cooling holes 60 are on slot axes 12 and 14, and another set of cooling holes 64 are situated on hole axes 12b and 14b. Although there are eight cooling hole radii, the degree of rotation is still 90 (360/4) degrees because there are only four slot radii.

FIG. 10 is a top view of a number of evenly spaced cooling holes 116 in a lamination 110 having a greater number of evenly spaced winding slots 111. This embodiment is different from the embodiments of FIGS. 4–7 because each hole 116 is symmetrically spaced along a circumference 114 such that if the lamination was to rotate by forty degrees each of the nine cooling holes would precisely overlap. However, in the embodiment of FIG. 10, a forty degree rotation would not be appropriate because the thirty-seven winding slots would not be precisely aligned. Instead the lamination is rotated by a designated number of slot axes (not shown) so that the slots are precisely aligned and the cooling holes are imprecisely aligned to form staggered cooling hole passages. In one embodiment, the laminations are arranged in one inch stacks. A first one inch stack is positioned on a support base, a second one inch stack is rotated clockwise by 12 winding slots and positioned on the first stack, and a third one inch stack is rotated counter-clockwise by 12 winding slots and positioned on the second stack. The use of the box-like shape cooling hole shape with rounded side edges 115 is advantageous because it results in rounded cooling hole passages.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for fabricating a stack of substantially identical motor laminations, comprising the steps of:

forming cooling holes on a plurality of hole axes in each of the motor laminations, at least one of the hole axes separating the motor laminations into two asymmetrical portions;

stacking an initial one of the motor laminations in an original orientation;

flipping over a subsequent one of the motor laminations on the at least one of the hole axes separating the motor laminations into two asymmetrical portions so that at least some of the holes of the subsequent one of the motor laminations are partially coincident but not located in identical positions in a flipped orientation as compared with the original orientation; and stacking the subsequent one of the motor laminations in the flipped orientation over the initial one of the motor laminations in the original orientation with respective ones of the cooling holes thus forming staggered cooling passages by having at least some of the cooling holes extending further into the cooling passages than others of the cooling holes to provide turbulence for mixing air at boundary layers of the cooling passages when bulk air flows through the cooling passages.

2. The method of claim 1, wherein the step of forming cooling holes comprises forming at least some of the perturbed cooling holes to be radially displaced from at least one other of the perturbed cooling holes or azimuthally displaced from a respective one of the plurality of hole axes.

3. The method of claim 1, wherein the step of forming cooling holes comprises forming at least some of the perturbed cooling holes a substantially constant radial distance from the center of a respective lamination and having perturbed shapes.

4. The method of claim 1, wherein each of the motor laminations has a plurality of slot axes and further including the step of forming evenly spaced winding slots along the slot axes in each of the plurality of motor laminations, and wherein the steps of stacking, flipping, and stacking are performed with the winding slots in the laminations congruent to form substantially smooth winding slot passages.

5. The method of claim 4, wherein each of the slot axes is in the same location as a respective one of the hole axes.

6. A stack of motor laminations, comprising:

a plurality of substantially identical motor laminations having cooling holes on a plurality of hole axes, at least one of the hole axes separating the motor laminations into two asymmetrical portions, the stack of motor laminations including some motor laminations which are stacked in an original orientation and some other motor laminations which are flipped over on the at least one of the hole axes separating the motor laminations into two asymmetrical portions so that at least some of the cooling holes of the some other motor laminations are partially coincident but not located in identical positions as compared with the cooling holes of the some motor laminations which are stacked in the original orientation with adjacent ones of the cooling holes thus forming staggered cooling passages with some of the cooling holes extending further into the cooling passages than others of the cooling holes to provide turbulence for mixing air at boundary layers of the cooling passages when bulk air flows through the cooling passages;

wherein the motor laminations have a plurality of evenly spaced winding slots with adjacent ones of the evenly spaced winding slots forming substantially smooth winding slot passages.

7. The stack of claim 6, wherein at least one of the cooling holes is radially displaced from at least one other of the cooling holes or azimuthally displaced from a respective one of the hole axes.

8. The stack of claim 6, wherein at least some of the cooling holes are situated a substantially constant radial distance from the center of a respective lamination and have perturbed shapes.

9. The stack of claim 6, wherein at least one of the cooling holes has a different size from at least one other of the cooling holes.

* * * * *